Figure 1:
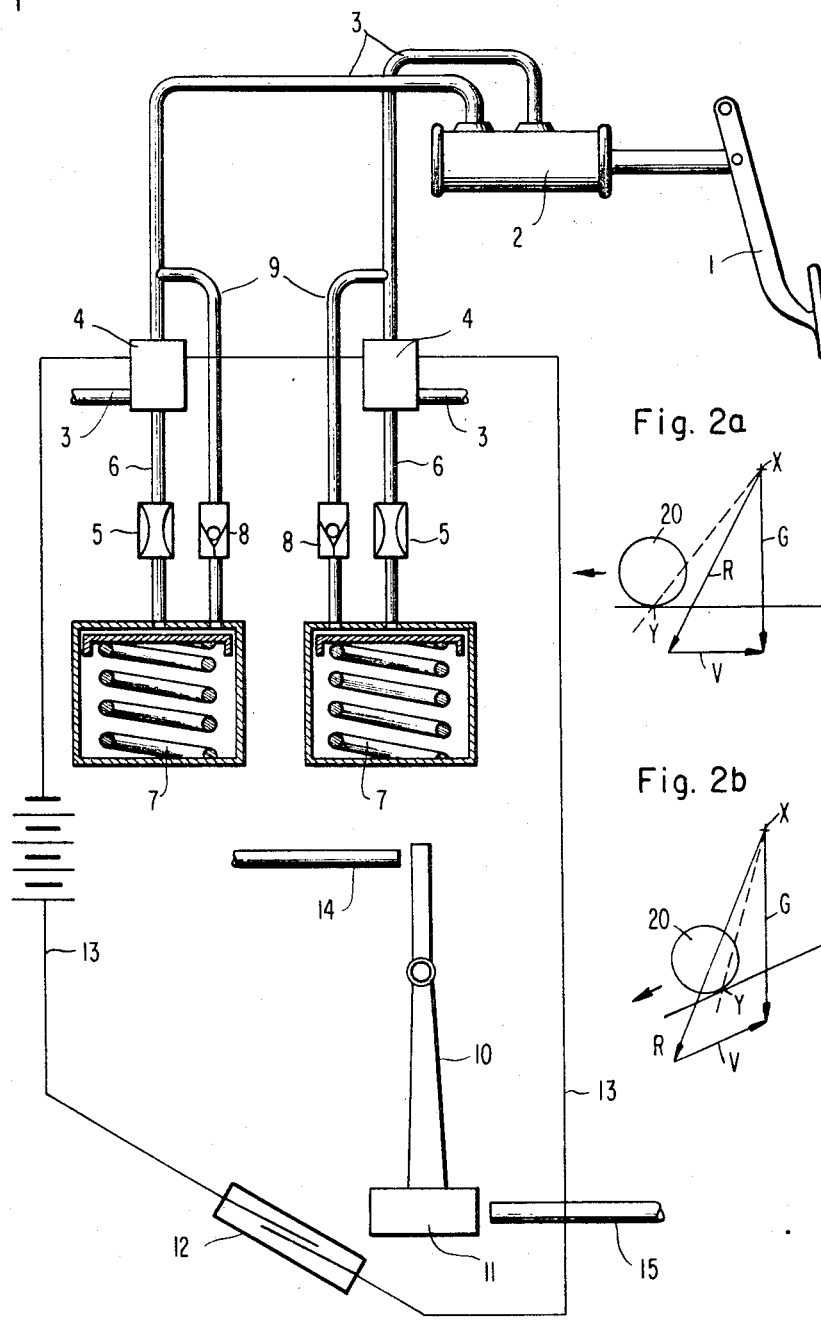

United States Patent [19]
Burckhardt

[11] 3,726,567
[45] Apr. 10, 1973

[54] DEVICE FOR PREVENTING THE OVER-BRAKING OF VEHICLES WITH HYDRAULIC BRAKE INSTALLATIONS

[75] Inventor: Manfred H. Burckhardt, Waiblingen, Germany

[73] Assignee: Daimler-Benz Aktiengesellschaft, Stuttgart-Unterturkheim, Germany

[22] Filed: Nov. 19, 1970

[21] Appl. No.: 90,998

[30] Foreign Application Priority Data

Nov. 21, 1969 Germany.....................P 19 58 628.8

[52] U.S. Cl. ...............................................303/21 F
[51] Int. Cl. ................................................B60t 8/06
[58] Field of Search ....................................303/21 F

[56] References Cited

UNITED STATES PATENTS

| 3,529,871 | 9/1970 | Burckhardt et al. | 303/21 F |
| 3,532,391 | 10/1970 | Klein | 303/21 F |

FOREIGN PATENTS OR APPLICATIONS

| 1,193,740 | 6/1970 | Great Britain | 303/21 F |

Primary Examiner—Evon C. Blunk
Assistant Examiner—Hadd S. Lane
Attorney—Craig and Antonelli

[57] ABSTRACT

An installation for preventing excessive braking of vehicles equipped with a hydraulic brake installation, particularly of commercial types of vehicles with a higher center of gravity, in which the pressure in the brake lines is automatically reduced upon exceeding a predetermined deceleration of the vehicle.

15 Claims, 3 Drawing Figures

PATENTED APR 10 1973 3,726,567

INVENTOR
MANFRED H. BURCKHARDT

BY Craig, Antonelli, Stewart & Hill

ATTORNEYS

DEVICE FOR PREVENTING THE OVER-BRAKING OF VEHICLES WITH HYDRAULIC BRAKE INSTALLATIONS

The present invention relates to an installation for the prevention of the over-braking of vehicles equipped with a hydraulic brake installation, especially of commercial-type vehicles with a relatively high center of gravity.

Commercial-type vehicles such as trucks, which are driven with a strongly varying load and differing trailer loads, pose special problems in the field of the brakes.

More particularly, if one designs the brakes in such a manner that large decelerations can be attained with a heavy load and/or during operation with a trailer, then the unloaded vehicle is easily over-braked, i.e., is easily braked excessively, which may lead readily to accidents, especially with vehicles that have a relatively high center of gravity.

A shifting of the brake installation, feasible as such, corresponding to the prevailing load of the vehicle, did not prove successful in practice because there exists the great danger that a false adjustment is selected inadvertently and an accident is caused thereby.

The present invention is therefore concerned with the task to provide an installation which automatically and safely prevents an over-braking independently of the load condition of the vehicle.

Accordingly, an installation for the prevention of the over-braking of vehicles with hydraulic braking installations, especially of commercial-types of vehicles with high center of gravity is proposed, by means of which according to the present invention, the pressure in the brake lines is automatically reduced upon exceeding a certain, predetermined deceleration.

Preferably three-way valves, and more particularly, magnetic three-way valves of this type are arranged in the brake lines for the reduction of the pressure, by way of which the brake fluid can be conducted into spring-loaded reservoirs or accumulators whereby the reservoirs or accumulators are advantageously emptied by way of check valves after the termination of the braking operation.

As transmitter, any deceleration measuring means can be used as such in accordance with the present invention which is able to switch a contact in case of a predetermined threshold value in the direction of the vehicle longitudinal axis.

However, the actuation of the arrangement according to the present invention takes place preferably by way of a pendulum of high natural or resonant frequency, swinging in a vehicle longitudinal plane and exposed to the centrifugal force, on which is arranged a permanent magnet, by means of which in case of a predetermined deflection of the pendulum, a magnetic switch disposed in a protective gas atmosphere is actuated which is connected in the energizing circuit of the magnetic valves.

Accordingly, it is an object of the present invention to provide a mechanism for preventing the over-braking of vehicles with hydraulic brake installations which effectively eliminates by simple means the aforementioned shortcomings and drawbacks encountered in the prior art.

Another object of the present invention resides in a device for preventing excessive braking of motor vehicles with hydraulic brake installations which is simple in construction yet automatically reduces the pressure in the brake lines when a predetermined deceleration is exceeded.

A further object of the present invention resides in a brake installation of the type described above which is simple and easy to manufacture and assemble, involves simple standard parts and increases the cost of the installation only relatively insignificantly.

Figure 2A:
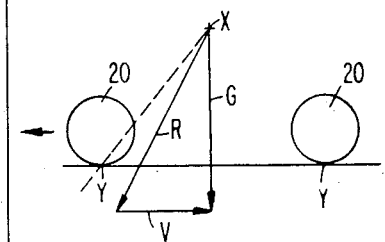
Figure 2B:
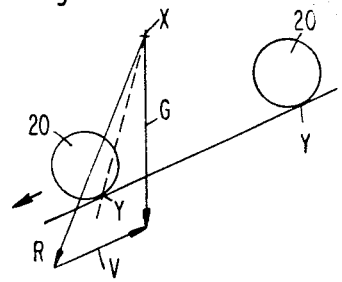

These and further objects, features and advantages of the present invention will become more obvious from the following description when taken in connection with the accompanying drawing which shows, for purposes of illustration only, one embodiment in accordance with the present invention, and wherein:

FIG. 1 is a schematic view of a two-circuit brake installation for vehicles in accordance with the present invention; and FIGS. 2a and 2b illustrate braking relationships for a vehicle on a planar and an inclined road surface, respectively.

Referring now to FIG. 1 of the drawing, the brake installation, properly speaking, essentially consists of a master brake cylinder 2 actuated by a brake pedal 1, from which brake lines 3 lead to the wheel brake cylinders (not shown). A three-way magnetic valve 4 of any conventional construction is arranged in series in each of the brake lines 3, from which one pipe line 6 each, provided with a throttling place 5, leads to a respective conventional spring-loaded reservoir or accumulator 7. A pipe line 9 provided with a check valve 8 leads from the respective tank or reservoir 7 to the associated brake line 3 for the emptying of the tank or reservoir 7 after the termination of a braking operation.

A pendulum 10 swinging in a vehicle longitudinal plane is provided as transmitter, on which is secured a permanent magnet 11, by means of which a conventional magnetic switch 12 disposed in a protective gas atmosphere is actuated in the presence of a predetermined deflection of the pendulum 10; the magnetic switch 12 is connected in the energizing circuit 13 of the magnetic valves 4 and closes the circuit upon actuation thereof by the magnet 11 on the pendulum 10. For purposes of limiting the movement of the pendulum 10 in one direction, an abutment 14 adjustable in a conventional manner (not shown) and a damping member 15 also adjustable in a conventional manner (not shown) are provided.

Referring now to FIG. 2 of the drawing, there is illustrated the braking relationship for a vehicle on a planar and an inclined road surface. As shown in FIG. 2a, the vehicle is moving in the direction of the arrow and the wheels 20 contact the road surface at a point which may be termed the wheel base point Y. With a vehicle on a planar road surface and a center of gravity at point X, there is no danger of overturning the vehicle if the resultant weight R from the weight G of the vehicle plotted from the center of gravity X and the deceleration V extends within the base points of the front and rear wheels or the resultant weight does not extend past the front wheel base point as shown in dashed line. In FIG. 2b, the vehicle is on an inclined road surface with the vehicle being driven downhill. In this figure, with the same deceleration V, the resultant weight R extends to the left of the dashed line through the base point of the front wheel such that the vehicle would overturn in this situation. However, the present invention avoids overturning of the vehicle by preventing the overbraking of the vehicle.

OPERATION

The operation of the installation described so far is such that upon exceeding a certain predetermined deceleration of the vehicle and thus exceeding a predetermined deflection of the pendulum 10 resulting therefrom, the magnetic switch 12 and therewith the magnetic valves 4 are actuated. As a result thereof, brake fluid flows into the spring-loaded reservoirs or accumulators 7 and the pressure in the brake system decreases until the deceleration of the vehicle is smaller than the predetermined threshold value. The volume of the reservoirs 7 is to be selected thereby in such a manner that approximately four to six times the working volume of a brake circuit can be stored therein.

The position of the magnetic switch 12 to the pendulum 10 should be so selected that the switching pulse occurs just shortly before a possible overturning of the vehicle. The possible deceleration thereby decreases corresponding to the incline over which the vehicle drives.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An installation for preventing the over-braking of vehicles equipped with a set of wheels on an axle and with a fluid pressure brake installation for the wheels, comprising means directly responsive to the longitudinal deceleration of the vehicle, means for generating fluid pressure for controlling brakes of the wheels, and control means responsive to said vehicle longitudinal deceleration means for changing the pressure in a brake line of the vehicle to a brake releasing condition upon exceeding a predetermined longitudinal deceleration of the vehicle.

2. An installation according to claim 1, characterized in that said control means for changing the pressure includes a three-way valve means arranged in the brake line and responsive to the longitudinal deceleration means, said three-way valve means being operable to divert the brake fluid into a spring-loaded tank means.

3. An installation according to claim 2, characterized in that the fluid is a liquid and that the tank means can be emptied after termination of a braking operation by way of a check valve means.

4. An installation according to claim 3, characterized in that a throttling means is provided in a line between the three-way valve means and the tank means.

5. Installation according to claim 4, characterized in that said control means includes a switch means responsive to the longitudinal deceleration means and that magnetically operated valves are used as three-way valve means.

6. An installation according to claim 5, characterized in that said longitudinal deceleration means includes a pendulum means, operable to swing substantially in a vehicle longitudinal plane and subjected to the deceleration force for actuating the switch means and thereby, the three-way valve means of said control means.

7. An installation according to claim 6, characterized in that a permanent magnet is arranged at the pendulum means, and that said switch means is a magnetically operated switch means actuated by said magnet in case of a predetermined deflection of the pendulum means, said magnetically operated switch means being connected in the energizing circuit of the magnetically operated valve means.

8. An installation according to claim 7, characterized in that said magnetically operated switch means is disposed within a protective gas atmosphere.

9. An installation according to claim 2, characterized in that a throttling means is provided in a line between the three-way valve means and the tank means.

10. An installation according to claim 2, characterized in that said control means includes a switch means responsive to the longitudinal deceleration means and that magnetically operated valves are used as three-way valve means.

11. An installation according to claim 2, characterized in that said longitudinal deceleration means includes a pendulum means, operable to swing substantially in a vehicle longitudinal plane and subject to the deceleration force for actuating a switch means and thereby, the three-way valve means of said control means.

12. An installation according to claim 11, characterized in that a permanent magnet is arranged at the pendulum means, and said switch means is a magnetically operated switch means actuated by said magnet in case of a predetermined deflection of the pendulum means, said magnetically operated switch means being connected in the energizing circuit of the magnetically operated valve means.

13. An installation according to claim 12, characterized in that said magnetically operated switch means is disposed within a protective gas atmosphere.

14. An installation according to claim 1, characterized in that the vehicle is a commercial-type vehicle with a resultant weight which passes beyond the road and front wheel contact when said predetermined deceleration is exceeded.

15. An installation according to claim 1, characterized in that the vehicle is a commercial-type vehicle with a resultant weight which passes beyond the road and front wheel contact when said predetermined deceleration is exceeded.

* * * * *